(12) United States Patent
Johnson-Roberson et al.

(10) Patent No.: US 12,065,162 B2
(45) Date of Patent: *Aug. 20, 2024

(54) METHOD AND SYSTEM FOR AUTONOMOUS VEHICLE CONTROL

(71) Applicant: Refraction AI, Inc., Ann Arbor, MI (US)

(72) Inventors: Matthew Johnson-Roberson, Ann Arbor, MI (US); Ram Vasudevan, Ann Arbor, MI (US)

(73) Assignee: Refraction AI, Inc, Ann Arbor, MI (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/522,473

(22) Filed: Nov. 9, 2021

(65) Prior Publication Data

US 2022/0063659 A1 Mar. 3, 2022

Related U.S. Application Data

(63) Continuation of application No. 16/921,086, filed on Jul. 6, 2020, now Pat. No. 11,208,117.
(Continued)

(51) Int. Cl.
*B60W 60/00* (2020.01)
*B60W 50/06* (2006.01)
(Continued)

(52) U.S. Cl.
CPC .......... *B60W 60/001* (2020.02); *B60W 50/06* (2013.01); *G01C 25/00* (2013.01);
(Continued)

(58) Field of Classification Search
CPC .................................................. B60W 60/001
See application file for complete search history.

(56) References Cited

U.S. PATENT DOCUMENTS 9,031,809 B1 5/2015 Kumar et al.
9,658,070 B2 5/2017 Roumeliotis et al.
(Continued)

FOREIGN PATENT DOCUMENTS

JP          4985516 B2 *  7/2012
JP          4985516 B2    7/2012
WO  WO-2016119950 A1 *  8/2016  ....... B32B 17/10036

OTHER PUBLICATIONS

Google machine translation of Japanese Patent Pub. No. JP4985516B2 (downloaded on Aug. 28, 2020).
(Continued)

*Primary Examiner* — Jean Paul Cass
(74) *Attorney, Agent, or Firm* — Jeffrey Schox; Diana Lin

(57) ABSTRACT

The method for autonomous vehicle control preferably includes sampling measurements, determining refined sensor poses based on the measurements, determining an updated vehicle pose based on the measurements and operation matrix, optionally determining evaluation sensor poses based on the refined sensor poses, optionally updating the operation matrix(es) based on the evaluation sensor poses, and/or any other suitable elements. The system for autonomous vehicle control can include one or more vehicles, one or more sensors, one or more processing systems, and/or any other suitable components.

19 Claims, 9 Drawing Sheets

Related U.S. Application Data

(60) Provisional application No. 62/944,841, filed on Dec. 6, 2019, provisional application No. 62/871,958, filed on Jul. 9, 2019.

(51) Int. Cl.
  *G01C 25/00* (2006.01)
  *G01S 7/497* (2006.01)
  *G01S 17/931* (2020.01)
  *G05D 1/00* (2024.01)

(52) U.S. Cl.
  CPC ............ *G01S 7/497* (2013.01); *G01S 17/931* (2020.01); *G05D 1/0088* (2013.01); *G05D 1/0251* (2013.01); *G05D 1/027* (2013.01); *B60W 2420/403* (2013.01)

(56) References Cited

U.S. PATENT DOCUMENTS

| | | | |
|---|---|---|---|
| 9,836,895 B1* | 12/2017 | Nygaard | G05D 1/0088 |
| 11,525,923 B2* | 12/2022 | Shin | G06T 19/00 |
| 11,541,843 B1* | 1/2023 | Stoffel | G07C 9/00857 |
| 11,605,236 B2* | 3/2023 | Goel | G06V 10/764 |
| 2012/0182392 A1 | 7/2012 | Kearns et al. | |
| 2013/0173109 A1 | 7/2013 | Hukkeri et al. | |
| 2013/0325244 A1 | 12/2013 | Wang et al. | |
| 2017/0023937 A1 | 1/2017 | Loianno et al. | |
| 2017/0124781 A1 | 5/2017 | Douillard et al. | |
| 2018/0180733 A1 | 6/2018 | Smits | |
| 2018/0217600 A1 | 8/2018 | Shashua et al. | |
| 2018/0217614 A1 | 8/2018 | Salas-Moreno et al. | |
| 2018/0275277 A1* | 9/2018 | Li | G01S 17/89 |
| 2019/0003836 A1 | 1/2019 | Zhang et al. | |
| 2019/0049242 A1 | 2/2019 | Adams et al. | |
| 2019/0049566 A1* | 2/2019 | Adams | G01C 25/00 |
| 2019/0154447 A1 | 5/2019 | Song et al. | |
| 2019/0258251 A1 | 8/2019 | Ditty et al. | |
| 2019/0311546 A1 | 10/2019 | Tay et al. | |
| 2019/0346271 A1 | 11/2019 | Zhang et al. | |
| 2020/0064483 A1 | 2/2020 | Li et al. | |
| 2020/0242396 A1* | 7/2020 | Holz | G05D 1/0234 |

OTHER PUBLICATIONS

Hong, Euntae et al. "Visual-Inertial Odometry with Robust Initialization and Online Scale Estimation" Division of Computer Science and Engineering, Hanyang University, Seoul 133-791, Korea, 21 pages.

Xiao, Yao "Online IMU Self-Calibration for Visual-Inertial Systems", www.mdpi.com/journal/sensors, 26 pages.

Jeong, Jinyong "Road is Enough! Extrinsic Calibration of Non-overlapping Stereo Camera and LiDAR using Road Information", arXiv:1902.10586v2 [cs.RO] Mar. 6, 2019, 8 pages.

Lourakis, Manolis et al., SBA, A software package for generic sparse bundle Adjustments, ACM Transactions on u Mathematical Software; Mar. 2009 Article No. 2 https://doi.org/10.1145/1486525.1486527 (2009).

Usenko, Vladyslav "Visual-Inertial Navigation for Autonomous Vehicles" 190 pages.

* cited by examiner

METHOD AND SYSTEM FOR AUTONOMOUS VEHICLE CONTROL

CROSS-REFERENCE TO RELATED APPLICATIONS

This application is a continuation of U.S. application Ser. No. 16/921,086 filed 6 Jul. 2020, which claims the benefit of U.S. Provisional Application No. 62/871,958 filed 9 Jul. 2019, and U.S. Provisional Application No. 62/944,841 filed 6 Dec. 2019, each of which is incorporated in its entirety by this reference.

TECHNICAL FIELD

This invention relates generally to the vehicle control field, and more specifically to a new and useful system and method for autonomous vehicle control.

BACKGROUND

Most autonomous robotic systems rely on the rigid body assumption, which is the assumption that once cameras are mounted onto a system such as a car, the camera and/or sensor measurements will be reliable over the course of a day or a week. That is to say, most cameras, when mounted to cars, trucks, or other heavy vehicles, are not affected by small bumps in the road such as potholes or speed bumps, or micromovements induced by road roughness. Light vehicles are interesting because they are specifically designed to be lightweight, so unlike heavier vehicles like cars and trucks, light vehicles are affected by bumps in the road; even a pebble can disturb and de-calibrate the localization system. Thus, there is a need for dynamic, online recalibration of the localization system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
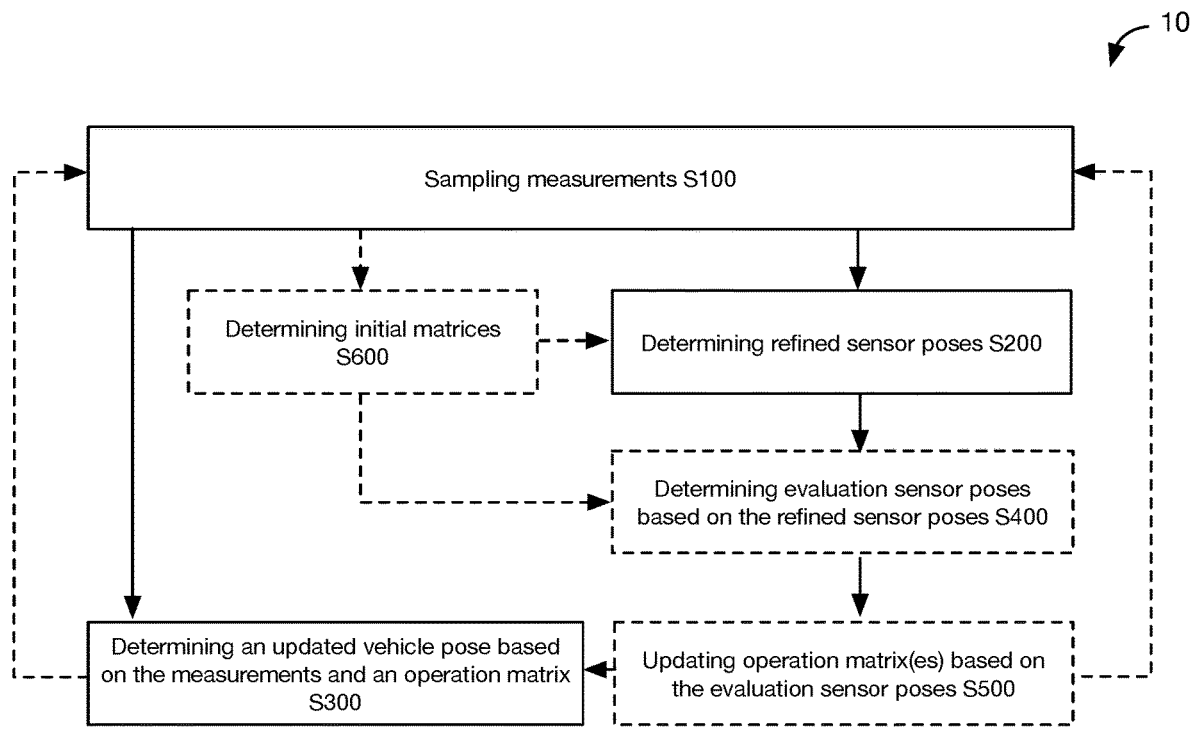
FIG. 1 is a schematic representation of the method.

As shown in FIG. 1, the method 10 for autonomous vehicle control includes: sampling measurements S100, determining refined sensor poses based on the measurements S200, determining an updated vehicle pose based on the measurements and an operation matrix S300, optionally determining evaluation sensor poses based on the refined sensor poses S400, and optionally updating the operation matrix(es) based on the evaluation sensor poses S500. However, online vehicle sensor calibration can be otherwise performed.

The method 10 preferably functions to determine the vehicle motion (e.g., for odometry, such as visual-inertial odometry) and the vehicle pose (e.g., (e.g., local or global vehicle position and/or orientation). The method 10 also functions to calibrate the vehicle sensors during vehicle operation (e.g., by dynamically updating the relative pose transformation matrices based on the sensor measurements). The method can simultaneously update and refine the sensor calibrations with respect to each other, the body frame, and the current operating conditions (e.g., temperature, noise, baseline acceleration, etc.). The method enables more accurate calibration matrix state estimation, which confers greater accuracy for using those same vehicle sensors for other tasks like obstacle detection and avoidance, drivable area identification, and/or any other suitable task.

The resultant vehicle motion (e.g., egomotion) and/or vehicle pose can be used for: map construction, localization, navigation, or other processes; to calibrate sensors that do not share a common field of view; and fuse local information from different sensors (e.g., align measurement coordinate systems, such as between visual systems and LIDAR systems); and/or any other functionalities.

Figure 2:
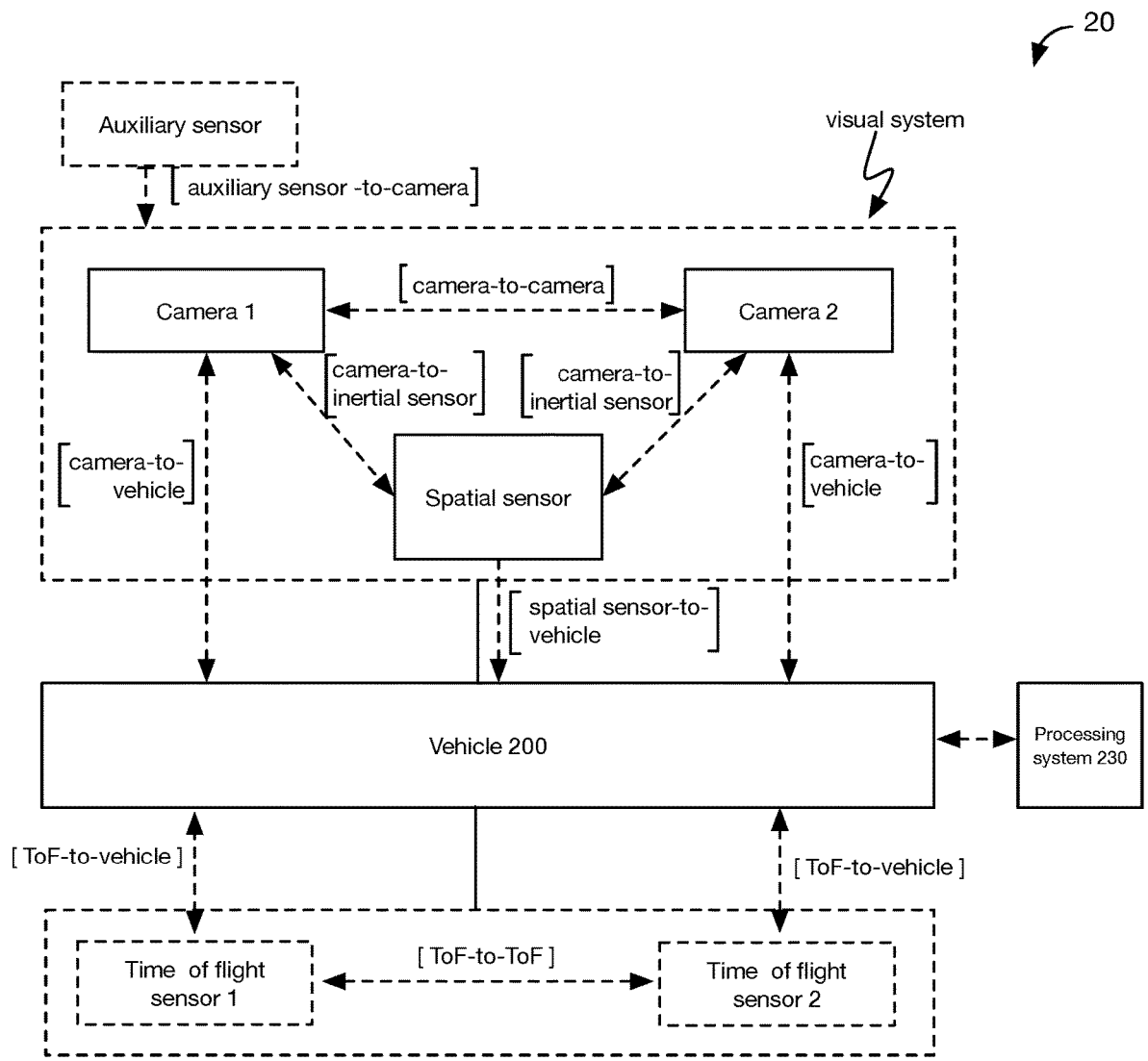
FIG. 2 is a schematic representation of the system.

As shown in FIG. 2, the system 20 for autonomous vehicle control can include one or more vehicles, one or more sensors, one or more processing systems, and/or any other suitable components.

2. EXAMPLES

Figure 4:
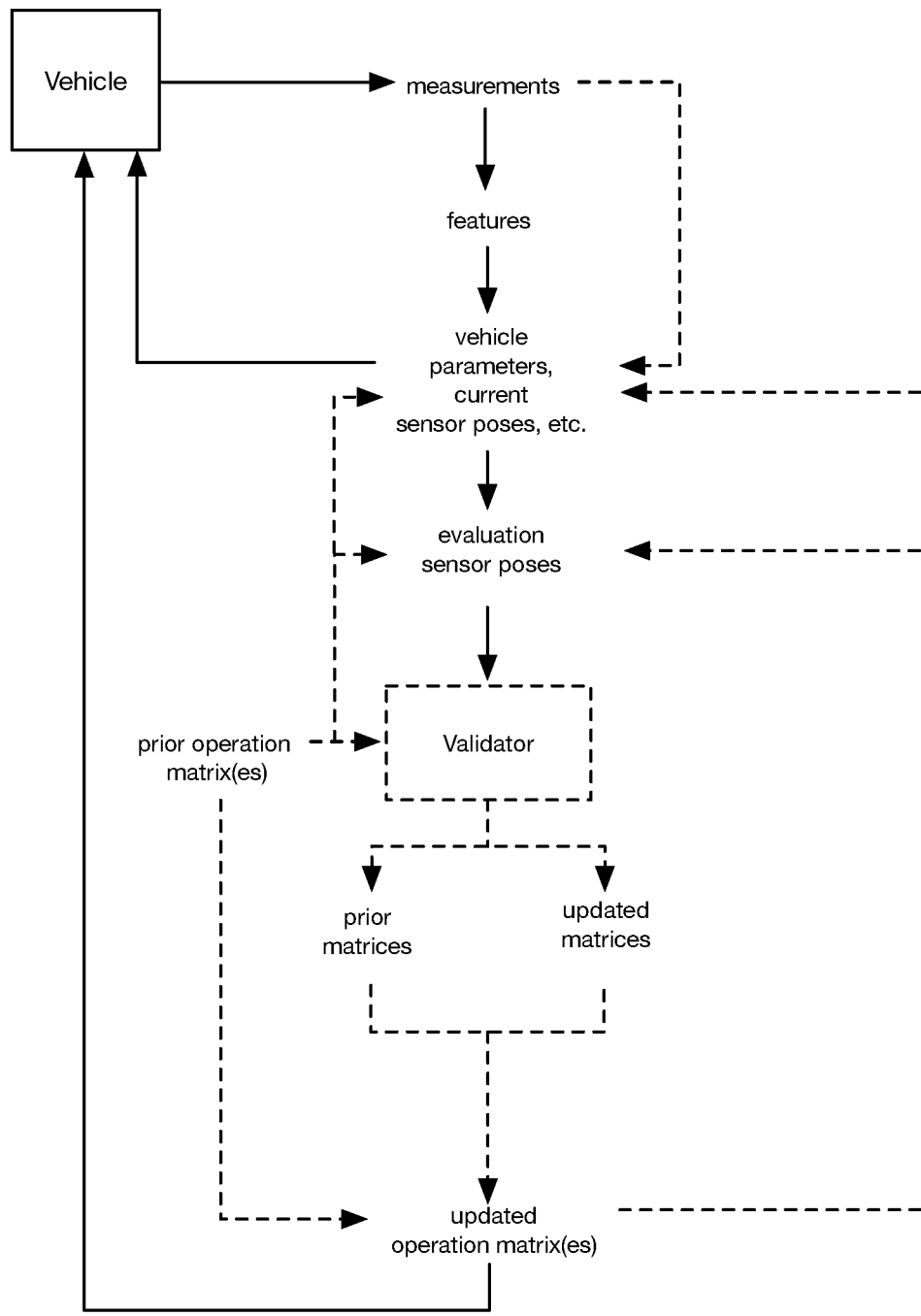

In a first example, the method 10 can include iteratively, during vehicle operation: sampling measurements from onboard sensors; extracting features from the measurements; determining a refined calibration matrix (e.g., refined sensor poses) based on the features using a bundle adjustment; determining an evaluation calibration matrix (e.g., updated sensor poses) based on the refined calibration matrix using a Kalman filter (e.g., filtering out noise in the calibration matrices over time); and, upon evaluation calibration matrix convergence (e.g., using a validator), updating the operation matrix with the converged calibration matrix. The method can optionally include determining vehicle motion between timesteps (e.g., a current relative vehicle pose) based on the features and an operation matrix; determining a vehicle pose (relative to a global reference) based on the current relative vehicle pose; and controlling the vehicle based on the vehicle pose. An example of the method is depicted in FIG. 4.

3. BENEFITS

The method 10 and system 20 can confer several benefits over conventional systems.

First, the system and method can enable online calibration. Camera systems are easily mis-calibrated during use, which can lead to invalid feature tracking, and when used for visual-inertial odometry, result in invalid ego pose estimates. This system and method dynamically recalibrate the calibration matrices (e.g., extrinsic matrices, intrinsic matrices, etc.) using solvers to fuse observations across multiple sensors. In variants, the calibration matrices (e.g., relative pose transformation matrices) are treated as variables (e.g., within a nonlinear bundle adjustment), wherein the calibration matrices can be adjusted to minimize the reprojection error across all cameras. The calibration matrices (e.g., output by the bundle adjustment) can additionally be treated as noisy states, wherein a true, hidden calibration matrix for a timestep can be estimated using a Kalman filter. Uncertainties can also be calculated for each calibration matrix. In response to the resultant (adjusted) calibration matrices converging over time, an adjusted calibration matrix(es) can be used in lieu of the prior calibration matrix(es).

Second, the system and method can confer temporal calibration consistency over the life of the vehicle or operation session by iteratively incrementally adjusting the sensor calibration throughout the operation session (e.g., such that the calibration approximates a spline over time), instead of only recalibrating when drastic miscalibration is detected. In variants, this can be accomplished by using a Kalman filter to filter and smooth the current relative poses that are output by the bundle adjustment over time.

Third, the system and method can be faster and more accurate than conventional systems and methods for visual odometry. In variants, all measurements (e.g., IMU measurements, wheel odometry measurements, GPS measurements, etc.) and/or extracted features can be fed into a single solver (e.g., a nonlinear bundle adjustment, wherein the nonlinear bundle adjustment can include a set of functions associated with each of a set desired outputs) and solved simultaneously. In variants, the system and method can promote rapid convergence.

Fourth, the system and method can enable stable optimization while maintaining sparsity across observations, or in other words, the method converges at every time step. This is especially challenging because the method operates on a high dimensional state space. The inventors discovered a new and useful way to architect an autonomous driving system and method to include time steps with sparse observations (e.g., because a feature is typically observed by only two of the plurality of cameras) to ensure that the observations across timestamps are not too dense, which would in turn use too much compute power for the system to operate as intended.

However, the method and system can confer any other suitable benefits.

4. SYSTEM 20

The method 10 is preferably performed using the system 20, including: one or more vehicles, one or more sensors, and one or more processing systems, and/or any other suitable components. The system is preferably a tightly coupled system that jointly optimizes over multiple sensor measurements, but can additionally or alternatively be loosely coupled.

In a first variation, the system 20 includes a vehicle with a statically mounted processing system and sensor suite. In a second variation, the system 20 includes a vehicle fleet, wherein each vehicle includes a different onboard processing system and sensor suite. In a third variation, the system 20 includes a processing system configured to perform the method 10 and electrically connected to the sensors onboard the vehicle. However, the system can be otherwise configured/

The vehicle 200 is preferably a terrestrial vehicle, more preferably a wheeled vehicle, but can additionally or alternatively be an aerial vehicle. The vehicle is preferably operable to transport one or more objects/items (packages for delivery), which can include takeout meals, packages, and/or any other suitable item. For example, the vehicle can be operable to transport one package for a first user at a first location, additionally, a second package for a second user at a second location, one or more packages for the same user, and/or any other suitable number of packages for any other suitable number of users. In examples, the vehicle structure can include tricycles (e.g. recumbent tricycles), skateboards, carts, cars, trucks, bicycles, scooters, pods, unmanned aerial vehicles (e.g., drones), velocipedes (and/or velocipedes, super- and/or ultra-lightweight vehicles, and/or any other suitable vehicles.

The vehicle is preferably light-weight and/or compact, but can additionally or alternatively have any suitable size, shape, and/or weight. The unloaded vehicle weight can be less than 1 ton, less than 300 lbs., less than 250 lbs., less than 200 lbs., less than 100 lbs., less than 80 lbs., less than 50 lbs., less than 20 lbs., be between 70-110 lbs., be between 50-150 lbs., be between 80-100 lbs., and/or any other suitable weight. When loaded, the vehicle can carry a maximum of an additional 75-180 lbs., 50-200 lbs., 20-50 lbs., and/or any other suitable additional cargo mass.

The stopping distance of the vehicle (e.g., unloaded or loaded) can be less than 1 ft., 2 ft., 3 ft., 4 ft., 5 ft., 6 ft., 7 ft., 8 ft., 9 ft., 10 ft., or another stopping distance; more than a predetermined distance (e.g., 5 ft., 10 ft., etc.), and/or have any other suitable stopping distance.

The vehicle preferably includes a vehicle frame, that functions to mount system components. The vehicle frame can include a rigid frame, an articulating frame, flexible frame, or any other suitable frame. The vehicle frame can statically, flexibly, actuatably, or otherwise mount the vehicle components. The vehicle frame can be a tricycle frame (e.g., recumbent, freight, etc.), wherein the paired wheels in the front or in the back, a ladder frame, unibody frame, x-frame, perimeter frame, platform frame, space frame, and/or any other suitable frame. The vehicle frame can be made of a material with some flexibility, such as aluminum alloys, carbon fiber, but can additionally or alternatively be steel, and/or any other suitable material. The vehicle stiffness is preferably between 100 Nm/°/kg to 150 Nm/°/kg, but can additionally or alternatively be higher or lower. The vehicle can be encompassed by a vehicle skin (e.g., housing) or not encompassed. The vehicle frame can include optical glass (e.g., to cover the one or more sensors), and/or any other suitable protective material.

The vehicle preferably includes a suspension system. The suspension system can include a bicycle-grade suspension system, a car-grade suspension system, and/or any other suitable suspension system. Examples of the vehicle suspension system include: metal springs, air springs, leaf springs, pneumatic dampers, hydraulic dampers, swing axle, sliding pillar, MacPherson strut/Chapman strut, upper and lower A-arm (double wishbone), multi-link suspension, semi-trailing arm suspension, swinging arm suspension, and/or any other suitable suspension. The vehicle can additionally or alternatively have no suspension system and/or be otherwise configured.

Figure 7:
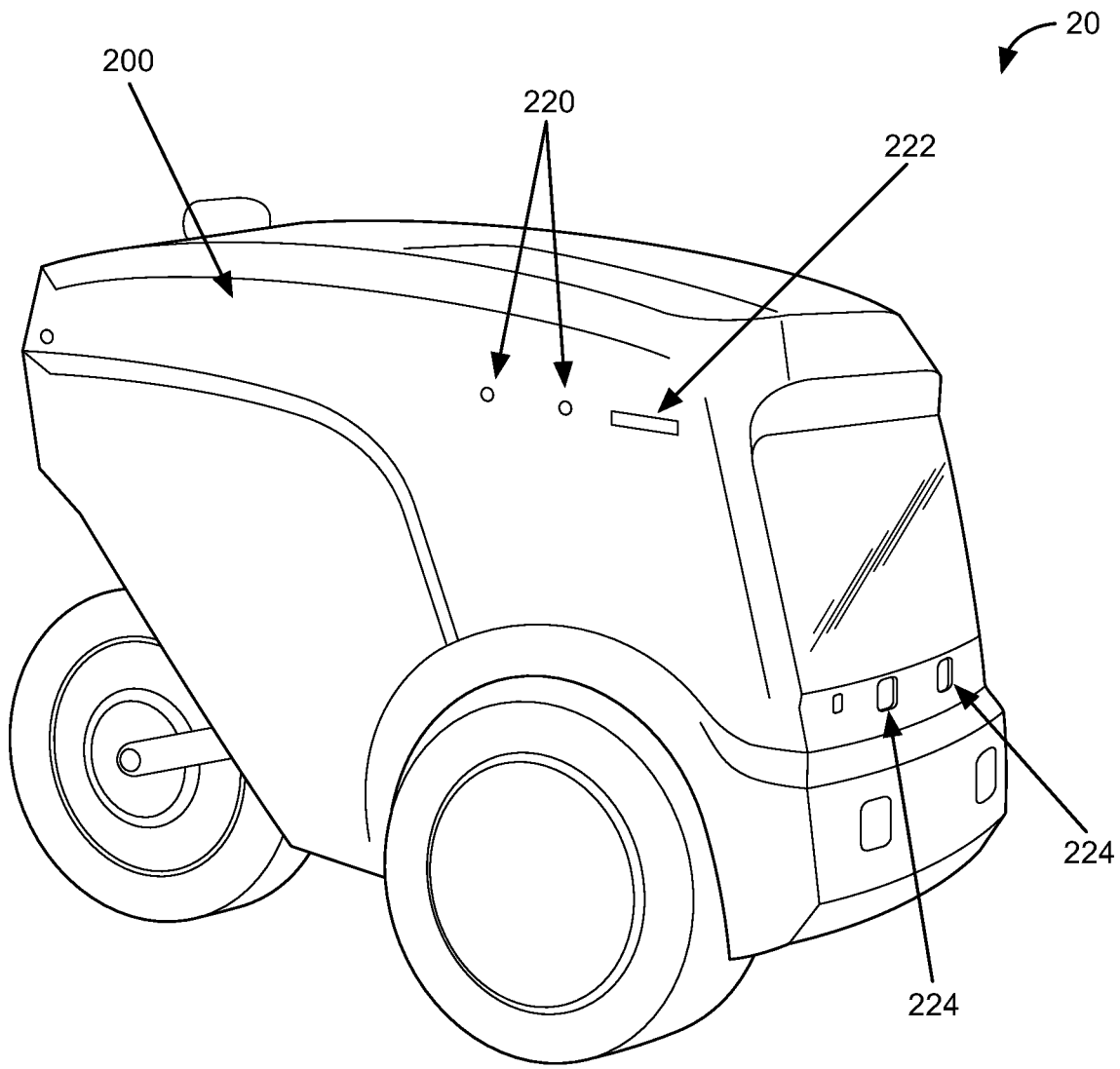
FIGS. 7-9 depict specific examples of the system.
Figure 8:
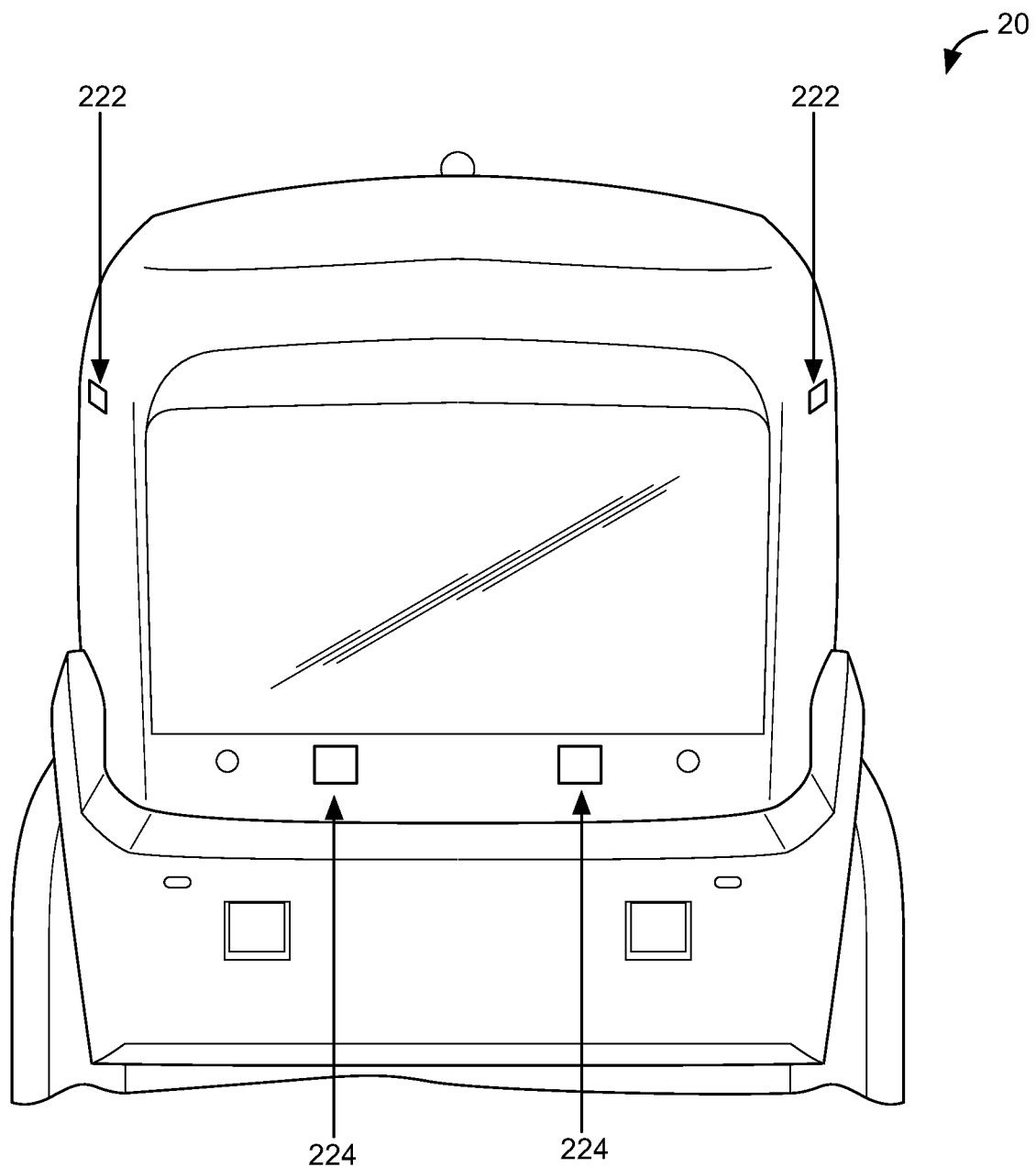
Figure 9:
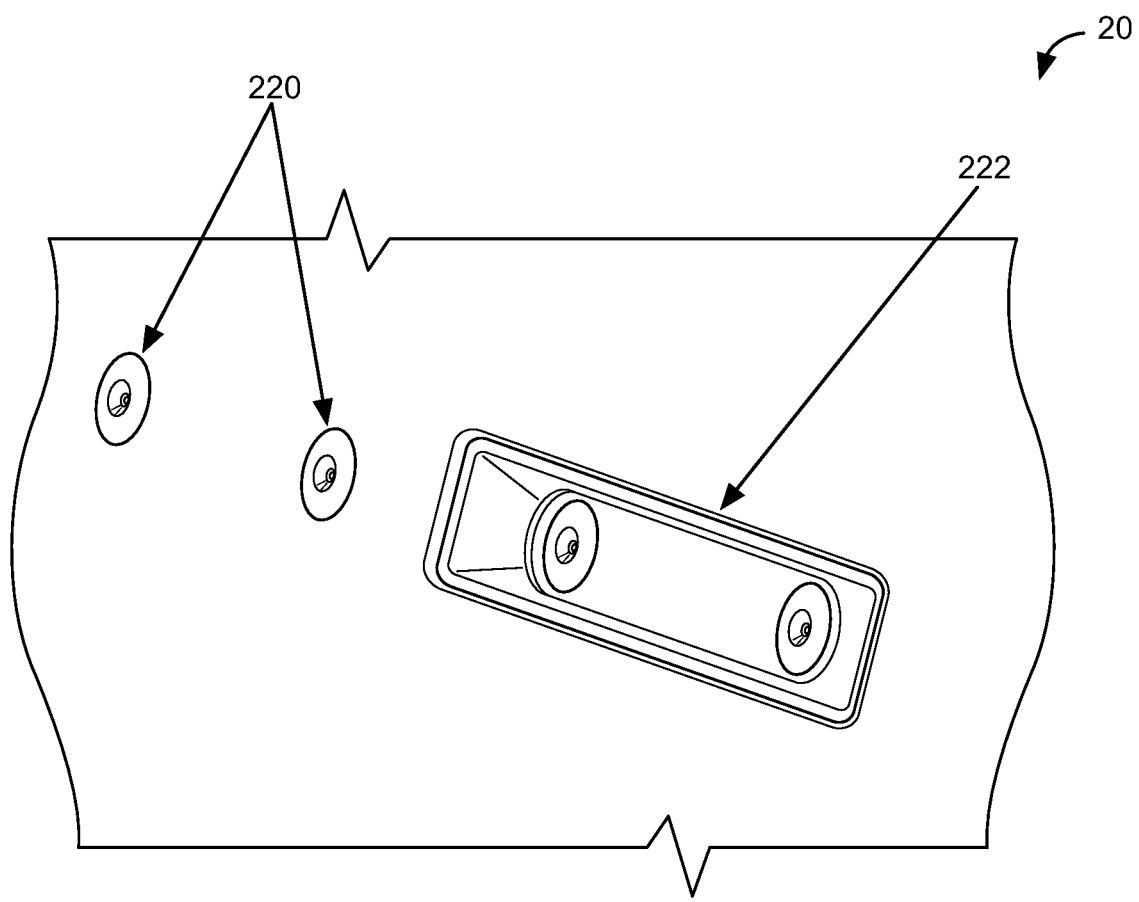

Specific examples of the vehicle are depicted in FIGS. 7-9.

The one or more sensors 220 can function to sample measurements for vehicle operation, telemetry, and/or dynamic recalibration. The sensors are preferably mounted to the vehicle (e.g., different locations on the vehicle, collocated on the vehicle, etc.), but can additionally or alternatively be mounted remote from the vehicle. More preferably the sensors are mounted to the vehicle frame but can additionally or alternatively be mounted to the vehicle skin or any other suitable component. The sensors can be mounted to or within a common housing, to separate housings, and/or any other suitable housing. The sensors can be statically mounted, actuatably mounted, and/or otherwise mounted to the vehicle. The sensors can be retrofitted to the vehicle, integrated into the vehicle, and/or otherwise mounted to the vehicle. Each sensor can include a local processing system that controls measurement sampling, or lack a local processing system and share a global processing system with other sensors. Each sensor's measurements are preferably sampled and timestamped by the respective processor, but can additionally or alternatively be timestamped using the processing system's clock as a global clock, a remote clock (e.g., of a remote system), and/or any other suitable clock. Each sensor's measurements are preferably timestamped at the kernel level, but can additionally or alternatively be timestamped at the user level, or any other suitable level.

The sensors can be electrically connected to the processing system (e.g., to process the sensor measurements; directly or via the local processing systems), not connected to the processing system (e.g., the local processing systems of each sensor can process each sensor's respective measurements), and/or otherwise configured.

The sensors can include cameras (e.g., CCD, CMOS, multispectral, visual range, hyperspectral, stereoscopic, wide-angle, RGB-Depth, event, etc.), spatial sensors (e.g., inertial measurement units (IMU), accelerometer, gyroscope, altimeter, magnetometer, compasses, etc.), wheel odometry sensors (e.g., Hall effect sensor, conductive collar, etc.), speedometer (e.g., tachometer, odometer, etc.), audio sensors (e.g., transducer, microphone, etc.), barometers, light sensors, thermal sensors (e.g., temperature and/or heat sensors, etc.), air flow meter, voltmeters, touch sensors (e.g., resistive, capacitive, etc.), proximity sensors, force sensors (e.g., strain gauge meter, load cell, scale, etc.), vibration sensors, chemical sensors, time of flight sensors (e.g., sonar, radar, LiDAR, rangefinder such as optical rangefinder, etc.), ultrasonic sensors, location sensors (e.g., GNSS, and/or other geopositioning modules, such as receivers for one or more of GPS, GLONASS, BeiDou, Galileo, etc.), inductive loops and/or weight sensors installed on roadways, radio-based sensors (e.g., radio communication devices such as Wi-Fi access points, cellular network towers and/or other access points, Bluetooth beacons, etc.), and/or any other suitable sensors. The sensors can sample measurements at a rate up to 200 Hz, 500 Hz, 1000 Hz, and/or any other suitable sampling rate. Different sensors preferably sample at different rates (e.g., spatial sensors sample faster than cameras), but can alternatively sample measurements at the same rate.

The system preferably includes a plurality of cameras, which function to capture a timeseries of images during vehicle operation. The cameras of the plurality are preferably arranged in stereocamera pairs, but can additionally or alternatively be arranged individually, and/or otherwise arranged. The cameras preferably cooperatively cover a 360-degree effective FOV, but the cameras can additionally or alternatively cover an effective FOV less than 360 degrees (e.g., 355, 345, 325, 315, 305, 295, 285, etc.). The cameras can have the same field-of-view (FOV), different FOVs, and/or any other suitable FOVs. A first set of the cameras can have a first FOV and a second set of the cameras can have a second FOV (e.g., the cameras positioned on the sides of the vehicle can have a wider FOV than the cameras facing forward). The cameras preferably have partially overlapping FOVs (e.g., between each camera of a pair, between different pairs, etc.), but can additionally or alternatively have non-overlapping FOVs (e.g., between each camera of a pair, between different pairs, etc.).

The system preferably includes a plurality of spatial sensors, which can function to detect sensor motion and/or vehicle motion. The spatial sensors can measure linear acceleration using one or more accelerometers, rotational rate using one or more gyroscopes, a heading reference using the magnetometer, and/or any other suitable measurement. The system preferably includes a plurality of spatial sensors, wherein a set of spatial sensors are preferably proximal to respective visual sensor systems (e.g., visual systems, cameras, LiDARs, etc.), but can additionally or alternatively be proximal to a respective sensor of the one or more sensors (e.g., each sensor can be paired with a spatial sensor), and/or otherwise proximal to one or more other sensors. The system can additionally or alternatively include one or more spatial sensors separate from the visual sensor systems and/or other sensors, which can function to measure pitch, yaw, and/or roll of the vehicle. These one or more spatial sensors can be positioned (e.g., mounted) to the center of the vehicle frame, to the center of the front of the vehicle, and/or otherwise positioned on the vehicle.

The system preferably includes one or more visual systems 222, which preferably include one or more cameras and one or more spatial sensors. The visual system can optionally include a local processor. The visual system preferably includes a common housing that functions to mount the cameras, the spatial sensor, and optionally the local processor. The common housing can include a base frame that mounts the cameras and optionally the spatial sensor and/or the local processor. The base frame can be a rigid frame (e.g., metal bar), a PCB board, and/or any other suitable frame.

The spatial sensor can be positioned between the cameras of the stereocamera, positioned in front of the stereocamera, behind, and/or otherwise positioned with respect to the stereocamera. The inertial sensor is preferably mounted between the stereocamera pair. More preferably, the initial sensor is preferably centered between the stereocamera pair and mounted to a rigid base frame connecting the cameras within the stereocamera pair. Alternatively, the spatial sensor can be statically mounted to the housing shared by the stereocamera pair. The spatial sensor pose relative to each camera is preferably known, but can alternatively be unknown. The spatial sensor can be electrically connected to the stereocamera pair, the local processor shared with the stereocamera pair, a different local processor from a processor associated with the stereocamera pair, the processing system, and/or any other suitable component.

In a first variation, the visual system includes multiple cameras connected to a spatial sensor. In a first example, the multiple cameras are a stereocamera pair and the stereocamera pair is electrically connected to the IMU, wherein the IMU is mounted in the center between the stereo cameras. The stereocamera pair and the IMU can be rigidly connected to a PCB board.

In a second variation, the visual system includes a camera electrically connected to a spatial sensor. In a first example, the camera is electrically connected to an IMU. In a second example, the camera is wirelessly connected to a remote processing system. In a third example, the IMU is mounted to or within the camera housing.

In a third variation, the visual system includes one or more cameras and a single spatial sensor, wherein each camera is connected (e.g., electrically and/or wirelessly) to the spatial sensor.

A specific example of the visual system is depicted in FIG. 9.

The system preferably includes a plurality of visual systems. The visual systems can be positioned at an 80-100-degree angle with respect to a gravity vector, 135-45-degree angle, 110-155-degree angle, and/or any other suitable angle. In a specific example, the plurality of visual systems can be positioned in different locations on the vehicle (e.g., left, right, front back, etc.). The visual systems can be positioned on one or more sides of the vehicle (e.g., 1-10 inches, 2-4 inches, 5-8 inches from the top of the vehicle; 1-10 inches, 2-4 inches, 5-8 inches from the bottom of the vehicle; etc.) and/or positioned at any other suitable position relative to the vehicle. The visual systems can additionally or alternatively include any other suitable components arranged in any other suitable position and/or arrangement.

The system preferably includes a one or more time of flight sensors 224. The time of flight sensors are preferably LiDAR sensors (e.g., flash lidar, phased array, MEMS such as spinning mirror, scanning lidar, etc.), but can additionally or alternatively be any other time of flight sensor listed above. The time of flight sensors preferably generate sparse point clouds of the environment during vehicle operation and/or traversal. The time of flight sensors can be statically mounted to the vehicle relative to the visual system(s). The time of flight sensor pose(s) are preferably known, but can alternatively be unknown (e.g., estimated during calibration).

The time of flight sensor preferably operates using a scanning pattern. The scanning pattern is preferably a non-repetitive scanning pattern (e.g., flowerlike scanning pattern), but can additionally or alternatively be a horizontal linear scanning pattern, horizontal vertical scanning pattern, or any other suitable scanning pattern.

In a first variation, the system includes one or more LiDAR sensors that preferably operate using a non-repetitive scanning pattern. The plurality of LiDAR scanners are preferably placed on the front of the vehicle with forward-facing field of view (e.g., 90 degree angle with respect to a gravity vector, 80-100 degree angle, 35-145 degree angle, and/or any other suitable angle). In a specific example, a LiDAR sensor is positioned on the front left side of the vehicle and a second LiDAR sensor is positioned on the front right side of the vehicle. A specific example is depicted in FIG. 8.

In a second variation, the system includes one or more LiDAR sensors mounted on top of the vehicle, the sides of the vehicle, the back of the vehicle, and/or mounted in any other position on the vehicle.

In one specific example, the system includes 14 cameras (e.g., 7 stereocamera pairs) and 6 IMUs to address both the state-estimation challenge and the intrinsically linked calibration and body reference frame offset estimation challenge, but the system configuration can additionally or alternatively address any other suitable challenge.

The processing system 230 functions to perform all or portions of the method 10, control the global capture of the visual systems, control vehicle operation (e.g., vehicle localization, SLAM, path planning, vehicle actuator control, etc.), and/or perform any other functionality. The processing system can be a local processing system (e.g., GPU, CPU, TPU, etc.), a remote processing system (e.g., stream raw data, extracted features, etc.), the processing system of the inertial sensor, and/or any other suitable processing system. The processing system can additionally or alternatively include any other suitable components.

The system preferably includes one or more power sources. The power source preferably includes a battery, more preferably a secondary battery, but alternatively include a single primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. However, the vehicle can additionally or alternatively include any other suitable elements.

The system preferably includes one or more communication modules (e.g., wireless communication module). The communication modules can transmit the data from the vehicle to a remote processing system, to a user device, to a third-party service, and/or to any other suitable recipient. The communication modules can include long-range communication modules (e.g., supporting long-range wireless protocols), short-range communication modules (e.g., supporting short-range wireless protocols), and/or any other suitable communication modules. The communication modules can include cellular radios (e.g., broadband cellular network radios), such as radios operable to communicate using 3G, 4G, and/or 5G technology, Wi-Fi radios, Bluetooth (e.g., BTLE) radios, NFC modules (e.g., active NFC, passive NFC), Zigbee radios, Z-wave radios, Thread radios, wired communication modules (e.g., wired interfaces such as USB interfaces), and/or any other suitable communication modules.

However, the system 20 can additionally or alternatively include any other suitable components arranged in any other suitable manner.

The system 20 can be used with relative sensor poses, which describe the relationship between a sensor position and a reference frame. The reference frame is preferably the vehicle frame (e.g., predetermined point on the vehicle frame, vehicle geometric centroid, etc.), but can alternatively be: another sensor, a global reference (e.g., a latitude and longitude), and/or any other suitable reference frame. The relative sensor poses within different relative pose sets can be relative to a common reference frame (e.g., vehicle, system, global reference, etc.), a specific reference frame (e.g., another sensor), and/or any other suitable reference frame.

The relative sensor poses can be determined using fiducials, iterative closest point (ICP), 2D pose estimation techniques (e.g., neural networks, deep neural networks, etc.), SLAM, and/or otherwise determined. The relative sensor poses can be updated using bundle adjustment and/or Kalman filters, but can additionally or alternatively be updated using fiducials, ICP, SLAM, and/or any other suitable process.

The relative sensor poses can be: refined relative sensor poses, evaluation relative sensor poses, operation relative sensor poses, and/or other types of relative sensor poses. The relative sensor poses are preferably determined online (e.g., onboard the vehicle, during vehicle operation, etc.), but can alternatively be determined offline (e.g., offboard the vehicle, during vehicle operation).

The refined relative sensor poses (refined sensor poses) can be the relative sensor poses for the current timestep, or otherwise defined. The refined sensor poses can be subject to noise in the sensor measurements, or have noise removed. The refined relative sensor poses can be output by the bundle adjustment based on features tracked or matched across image frames, or otherwise determined.

The evaluation relative sensor poses (evaluation sensor poses) can be the hidden (e.g., noise-removed, actual, estimated, smoothed) relative sensor poses for the current timestep, or otherwise defined. The evaluation sensor poses can be output by the Kalman filter based on the refined sensor poses, a prior evaluation sensor pose (e.g., from the prior timestep, the operation matrix, etc.), and the prior uncertainty matrix, but can be otherwise determined. The evaluation sensor poses can optionally be used to determine a consistent shift in the sensor poses from the initial poses, be used to determine updated operation matrices, and/or otherwise used.

The relative sensor poses can include (or be used to determine) operation matrix(es), which are used as the calibration matrices for routine vehicle operation. The operation matrices can be: the initial matrices (e.g., extrinsic matrices, intrinsic matrices), updated matrices (e.g., determined from the evaluation sensor poses), and/or otherwise determined calibration matrices. In a first variation, a single operation matrix, transforming all sensor measurements to a single coordinate system (e.g., the vehicle coordinate system), is used. In a second variation, multiple operation matrices, each transforming different sensor measurements to the same or different coordinate system, are used. The operation matrix can represent the most accurate version(s) of the transformation matrix(es), or other forms of the transformation matrix(es). The operation matrix is preferably updated by the processing system, but can additionally or alternatively be updated by a remote processing system, and/or any other suitable system. The operation matrix can be updated during a driving session, after a driving session (e.g., and used in a subsequent driving session), and/or updated at any other suitable time.

The initial matrices can be matrixes that are determined during initial calibration (e.g., before the driving session, before a vehicle deployment, used as a basis for further calibration, etc.). The initial matrices are preferably determined before a driving session, but can alternatively be determined online. The relative sensor poses can be: the pose (e.g., position and/or orientation) of the sensor relative to the reference frame, a calibration matrix (e.g., transformation matrix, rigid body transform) transforming the sensor's measurements to the reference frame's coordinate system, and/or otherwise defined. In a first variation, the calibration matrix can be determined from the relative sensor pose. In a second variation, the calibration matrix can be directly determined, wherein the relative sensor poses are calculated from the calibration matrix. In a third variation, the relative sensor poses are calibration matrices.

The calibration matrices function to enable global alignment between data collected by different sensors. The calibration matrices can include a rigid body transform that can express the relative pose estimate of different components with respect to each other. The calibration matrices can be transformation matrices, but can additionally or alternatively be vectors, other matrices, tensors, and/or any other data structure.

The calibration matrices can include intrinsic matrices, extrinsic matrices, absolute positions and/or orientations, and/or any other suitable elements. One or more of the calibration matrices can be updated by the method, but the calibration matrices can be additionally or alternatively not updated by the method.

The intrinsic matrices (e.g., focal length, optical center, skew coefficient) are preferably not updated, but can alternatively be updated during vehicle operation (e.g., within the bundle adjustment, within the Kalman filter).

The extrinsic matrices (e.g., pose transformation matrices, such as rotation, translation, etc.) are preferably updated during vehicle operation, but can alternatively be updated between vehicle operation sessions, or not updated. The extrinsic matrices can include, for each camera of the visual system, a camera-to-vehicle transformation and a spatial sensor-to-vehicle transformation (e.g., IMU-to-vehicle transformation). However, the extrinsic matrices can additionally include camera-to-camera transformations (e.g., for cameras of a pair), camera-to-IMU transformations for each camera of the visual system, time of flight-to-time of flight transformations for different time of flight sensors (e.g., LiDAR-to-LiDAR transformations), time of flight sensor-to-vehicle transformation (e.g., for each time of flight sensor), wheel-to-vehicle transformations, GPS-to-vehicle transformations, and/or a relationship of every component (or subset thereof) to every other component (or subset thereof). A variant of the extrinsic matrices is depicted in FIG. 2.

The pose (e.g., absolute position and/or orientation relative to a reference frame) can be values, vectors, and/or any other suitable data element. The absolute position and/or orientation can include relative pose of each camera (or a subset thereof) to the vehicle, relative pose of each spatial sensor (or a subset thereof) to the vehicle (e.g., relative pose of each IMU to the vehicle), relative pose of spatial sensors to cameras, relative pose of each time of flight sensor (or a subset thereof) to the vehicle, relative pose of each cameras (or a subset thereof) to each other camera (or a subset thereof), relative pose of each time of flight sensor (or a subset thereof) to each other time of flight sensor (or a subset thereof) (e.g., relative pose of each LiDAR sensor to each other LiDAR sensor), relative pose of the one or more wheel odometry sensors (or a subset thereof) to the vehicle, relative pose of the one or more location sensors to the vehicle (e.g., GPS to the vehicle), and/or any other suitable relative pose of every component (or subset thereof) to every other component (or subset thereof). However, the system can additionally or alternatively be used with any other suitable elements.

5. METHOD

The method 10 for autonomous vehicle control includes: sampling measurements S100, determining refined sensor poses based on the measurements S200, determining an updated vehicle pose based on the measurements and the operation matrix S300, optionally determining evaluation sensor poses based on the refined sensor poses S400, and optionally updating the operation matrices based on the evaluation sensor poses S500. However, the method can be otherwise performed.

The method is preferably performed online (e.g., performed onboard the vehicle, during vehicle operation), but can additionally or alternatively be calculated offline (e.g., performed offboard the vehicle during operation, performed asynchronously with vehicle operation, etc.). The method can be performed in real- or near-real time (e.g., contemporaneously or immediately after sensor measurement sampling), asynchronously with data sampling, and/or at any other suitable time relative to data sampling.

Figure 6:
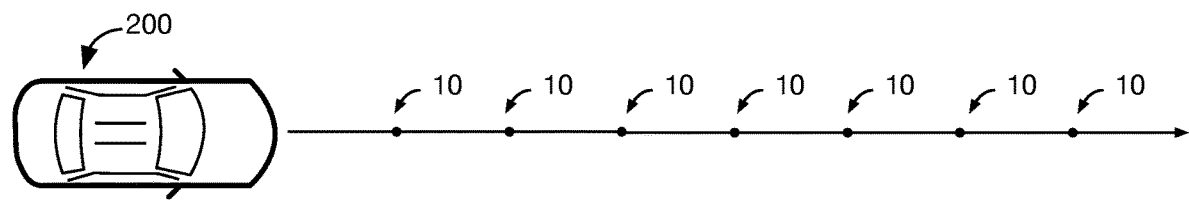
FIG. 6 depicts an embodiment of the system and method.

The method can be iteratively performed during vehicle operation, across the vehicle lifetime, at a predetermined frequency (e.g., on a schedule), in response to a recalibration event (e.g., when vehicle vertical acceleration exceeds a predetermined threshold, when vehicle deceleration exceeds a predetermined threshold, etc.), in response to a trigger event (e.g., sufficient data points captured, a calibration score satisfying a threshold, etc.), and/or at any other suitable time. A variant of vehicle operation is depicted in FIG. 6.

The method is preferably performed by the system. More preferably the method is performed by the processing system onboard the vehicle, but can additionally or alternatively be performed by a remote processing system, and/or any other suitable system.

5.1 Sampling Measurements S100

Sampling measurements S100 functions to collect vehicle sensor measurements for localizing the vehicle and updating the relative sensors poses as the one or more visual systems shift over time, but can additionally or alternatively provide any other suitable functionality. The measurements are preferably sampled from the one or more sensors of the system. More preferably, the measurements are sampled from the time of flight sensors (ToF), the cameras, the spatial sensors, the thermal sensors, the wheel odometry sensors, and/or any other sensor listed above. Sampling the measurements can be controlled by the local processor of a sensor, the processing system, a remote processing system, and/or any other suitable processing system.

The measurements are preferably sampled during a driving session (e.g., during vehicle translation, during vehicle deployment, etc.), but can be additionally be sampled before vehicle deployment (e.g., to determine initial matrices), or sampled at any other suitable time. Sampling the measurements is preferably performed continuously (e.g., at a predetermined sampling rate for each sensor and/or the system), but can additionally or alternatively be performed periodically in batches (e.g., one batch can correspond with 2 or more timestamps, such as time t, time t+1, time t+2, time t+3, etc.), and/or sampled at any other suitable time. The one or more sensors are preferably sampled with respect to the global clock, but can additionally or alternatively be sampled with respect to any other suitable clock. Different sensors can be sampled at different frequencies (e.g., the spatial sensors can be sampled at a higher frequency than the cameras), the same frequency, and/or any other suitable frequency. The sampling frequency can be 100-500 Hz, 200-400 Hz, 200-1000 Hz, less than 1000 Hz, and/or any other suitable sampling frequency.

The measurements can include sensor measurements from the one or more sensors of the system, which can be: images, video, inertial measurements, wheel odometry measurements, GPS measurements, LiDAR point cloud measurements, cellular chipset measurements (e.g., to determine differential corrections), temperature measurements, and/or any other suitable measurements. The LiDAR point cloud measurements are preferably sparse, but can additionally or alternatively be dense. The measurements are preferably self-consistent, but can additionally or alternatively not be self-consistent, and/or otherwise characterized.

Sampling the measurements can include associating the sensor measurements with timestamps. Associating the sensor measurements with timestamps can include interpolating timestamps for the spatial measurements (e.g., LiDAR points, etc.).

Sampling the measurements can include synchronizing the timestamps of the sensor measurements. The sensor measurements can be synchronized at the kernel level, the user level, and/or any other suitable level.

Sampling the measurements can include filtering sensor measurements (e.g., images, video, frames, audio, etc.). The sensor measurements can be filtered based on: the sensor measurement itself, an auxiliary measurement (e.g., spatial measurement) from another sensor associated with the primary sensor (e.g., camera, lidar, etc.), or other data. For example, image frames can be filtered based on spatial measurements sampled by a spatial sensor associated with (e.g., mounted to) the source camera. The auxiliary measurements associated with the primary sensor can include: inertial measurements sampled during the same timestamp or timeframe as the primary sensor measurement, inertial measurements sampled by the spatial sensor mounted to and/or monitoring the primary sensor (e.g., the IMU mounted to the visual system), inertial measurements sampled by the spatial sensor mounted to the vehicle, a combination thereof, and/or any other suitable inertial measurements. In a specific example, sensor measurements can be filtered when the associated inertial measurement exceeds a predetermined threshold (e.g., 0.1, 0.2, 0.3, 0.5, 1, 1.5, 2, 3, 4, 5 meters per second squared, etc.).

In a first variation, a particular visual system can determine a set of visual measurements and acceleration measurements from the cameras and IMU, respectively, of the visual system. The visual measurements can be filtered based on the acceleration measurements with the same timestamp (or same timeframe) for the particular visual system.

In a second variation, time of flight measurements (e.g., LiDAR points, etc.) can be filtered based on interpolated timestamps overlapping with timestamps of acceleration measurements from spatial sensors within a predetermined distance from the LiDAR sensor (e.g., 1-3 cm, 2-5 cm, 3-10 cm, 5-20 cm, 10-30 cm, etc.).

However, sampling the measurements can additionally or alternatively include any other suitable elements performed in any other suitable manner.

5.2 Determining Refined Sensor Poses Based on the Measurements S200

Determining refined sensor poses based on the measurements S200 functions to determine updated sensor poses based on the sensor measurements.

The refined sensor poses can be determined for each timestamp, for each measurement from S100, periodically at a predetermined frequency (e.g., the frequency at which the sensors sample the data, 2× the frequency at which the sensors sample the data, etc.), and/or at any other suitable frequency.

The refined sensor poses are preferably determined online (e.g., onboard the vehicle by the processing system), but can additionally or alternatively be determined offline.

Determining the refined sensor poses can include: extracting features from the measurements; and calculating a refined sensor pose based on the extracted features. However, the refined sensor poses can be otherwise determined.

Extracting features from the measurements functions to determine features (e.g., of the environment) for the time step. Extracting features can optionally function to identify the features of interest (e.g., static features, matched features, unique features, etc.), down sample or select features (e.g., to maintain feature sparsity), or otherwise process the extracted features. The features can be used: as an input for determining the refined sensor poses, to aid in feature tracking across different timestamps, to aid in sensor data fusion, and/or otherwise used. The features are preferably extracted by a feature extractor (e.g., executing on the local or global processing system), but can be otherwise extracted.

The features are preferably extracted continuously (e.g., contemporaneously with S200), but can additionally or alternatively be extracted in batches, and/or at any other suitable time. In a first variation, the features are extracted periodically for each timestamp. In a second variation, the features are extracted periodically for multiple timestamps (e.g., every 10 seconds, every 30 seconds, every minute, etc.). In a third variation, the features are extracted for each Nth timestamp. However, the features can additionally or alternatively be extracted at any other suitable time.

Extracting features is preferably performed using the sensor measurements from S100 (e.g., from the visual measurements, from the time of flight measurements, etc.). In a first variation, features are extracted from images sampled by each stereocamera pair. In a second variation, features are extracted from images sampled over time (e.g., by same or different cameras and/or time of flight sensors). In a third variation, the features are extracted from point clouds sampled over time from the one or more LiDAR sensors.

The features can include 2D features (e.g., corners; line segments; edges; edgles; blobs; pyramid features; contours; joint lines; optical flow of points and lines; gradients, such as color gradients; bitplanes; etc.), 3D features (e.g., 3D camera poses, such as measured in meters; 3D point clouds; 3D line clouds; 2D feature correspondences; planar homographies; higher-order primitives, such as spheres, cuboids, etc.; inertial data; etc.), and/or any other suitable features.

The features are preferably present in measurements from two or more different cameras and/or time of flight sensors, but can additionally or alternatively present in measurements from a single sensor.

The features can be static relative to the environment (e.g., street signs, buildings, etc.) and/or dynamic relative to the environment (e.g., other vehicles, humans, bicycles, etc.).

In a first variation, the features can be extracted from the stereocamera measurements (e.g., images), LiDAR measurement (e.g., point clouds), and/or any other sensor measurement.

In a second variation, both static features and dynamic features can be detected in the images, point clouds, and/or other measurements, such as using segmentation techniques, optical flow, and/or any other suitable techniques. The static and/or dynamic features can be extracted to form the set of features. In a first example, only the static features can be extracted to form the set of features.

In a third variation, additional features can be added to the set of features, wherein the additional features can be determined based on the existing set of features (e.g., determining 3D features from 2D features).

The extracted features can be determined based on: depth information from stereo pairs (e.g., images from two cameras of the stereocamera pair can be used to triangulate distances); corner detectors (e.g., Harris corner detectors, neural networks, etc.), photogrammetry (e.g., 3D features can be extracted using algorithms such as structure from motion (SFM), multi-view stereo (MVS), and/or any other suitable algorithm); 3D point projection (e.g., determine image planes for an image pair using respective camera poses and project 3D points to both image planes using the camera poses); and/or other feature extraction techniques.

In a first example, extracting features can include using SFM and/or MVS to obtain 2D and 3D features and 3D camera poses for each of the images captured by the visual system.

In a second example, extracting features can include matching features in 2D and 3D between timestamps t and t+1 using a sensor model. The sensor model can additionally output uncertainties, which can represent measurement consistency between subsequent frames.

In a third example, extracting features can include determining feature correspondences across stereo image pairs by triangulating 3D feature positions (e.g., relative to the camera, global position, etc.) based on feature correspondences and/or relative sensor poses.

However, extracting features can additionally or alternatively include any other suitable elements performed in any other suitable manner.

Calculating the refined sensor pose functions to estimate the pose for each of a set of sensors based on the features extracted from their respective measurements. Calculating the refined sensor pose can optionally include determining an associated uncertainty, residual, and/or other information (e.g., using the same or different calculation). The refined sensor pose is preferably determined using a bundle adjustment, but can be otherwise determined.

Calculating the refined sensor poses can include performing feature tracking across measurements from different visual systems and/or different cameras as part of the bundle adjustment. Additionally or alternatively, feature tracking can be performed before calculating the refined sensor poses and/or at any other suitable time (e.g., using optical flow or other suitable techniques). The tracked features can be used to calculate the refined sensor poses, and/or for any other suitable process.

The refined sensor poses can be determined (e.g., calculated) based on the tracked features, extracted features, the measurements from S100 (e.g., sensor data, operation data, etc.), control instructions, initialization variables, the operation matrix for the current timestep (e.g., matrix used to determine vehicle pose), an evaluation matrix from the prior timestep (e.g., matrix output by Kalman filter, which is not necessarily used as the operation matrix), the initial matrix (es) (e.g., from S600), constraints (e.g., physical constraints, calculation constraints, assumptions, etc.), and/or any other suitable information.

The initialization variables can include one or more prior relative poses (e.g., from S700), IMU drift biases from a previous timestep, and/or any other suitable variable.

The IMU drift biases can be adjusted after each step of the bundle adjustment, after the bundle adjustment completion, and/or at any other suitable time.

In a specific example, the initialization variables can be treated as adjustable variables that can be adjusted during iterative residual error minimization (e.g., reprojection error minimization) and/or point-to-point residual error minimization (e.g., point-to-point error minimization).

In a specific example, S200 can be performed based on the measurements from S100 (e.g., wheel odometry measurements; GPS measurements, such as from an Li receiver, differential corrections over cellular modems, etc.; IMU measurements from a prior timestep associated to the current timestep, which can include multiple measurements; visual measurements, such as images, video, point clouds, any other visual measurement; etc.), one or more extracted feature (e.g., features extracted from the camera and LiDAR measurements), The constraints function to constrain the refined sensor pose calculation to be physics-complaint, to reduce computational time, and/or otherwise used. The constraints are preferably manually determined, but can additionally or alternatively be automatically determined (e.g., learned, etc.), or otherwise determined. The constraints can be based on: a gravity vector and/or axes of allowable camera motion (e.g., vertical movement with respect to the ground; horizontal movement with respect to the ground; movement with respect to the components of the visual system, such as the associated camera in the camera pair, the IMU, and/or any other suitable component, etc.). The movement can be substantially small motion such as 1 degree, 2 degrees, 1 mm, 0.01 mm, and/or any other suitable movement. The constraints can include value-based constraints (e.g., maximum, minimum, etc.), conditional constraints, and/or any other suitable constraints.

Determining the refined sensor poses can optionally include determining an associated refined sensor pose uncertainty (e.g., uncertainty of the refined sensor pose estimates), such as for use in S400. The refined sensor pose uncertainty is preferably output by the bundle adjustment. However, the refined sensor pose uncertainty can additionally or alternatively be calculated based on a difference between a current refined sensor pose and one or more prior refined sensor poses or otherwise calculated.

Determining the refined sensor poses can optionally include determining one or more vehicle parameters. The vehicle parameters can include vehicle motion (e.g., egomotion, such as the vehicle's motion over time), a relative pose of vehicle from last timestep to this timestep, sensor biases (e.g., drift and/or offset from an average signal measurement), and/or any other parameter.

The sensor biases can include sensor biases per sensor. The sensor biases can be: spatial drift biases along all spatial drift axes for all spatial sensors (e.g., IMU drift biases along all IMU drift axes for all IMU sensors, etc.); wheel odometry measurement bias relative to the vehicle; GPS measurement bias relative to the vehicle; and/or any other suitable bias.

In a specific example, determining the refined sensor poses can include determining IMU drift biases along all IMU drift axes for all IMUs (or a subset thereof), wheel odometry measurement bias relative to the vehicle, GPS measurement bias relative to the vehicle, and/or any other suitable parameter.

The refined sensor poses, the vehicle parameters, and/or uncertainties are preferably determined using one or more bundle adjustments, but can additionally or alternatively be determined using analytic and/or geometric processes, Kalman filters (e.g., extended, linear, etc.), learning-based methods (e.g., learn the mapping from the extracted features to pose transforms, and/or any other suitable process.

The bundle adjustment is preferably a non-linear bundle adjustment that functions to minimize reprojection error between image locations of observed and predicted points and/or minimize point-to-point residuals (e.g., for point clouds). The bundle adjustment is preferably initialized using the one or more initialization variables previously described. However, any other suitable bundle adjustment can be used.

The same bundle adjustment can optionally also be used to determine the updated vehicle pose in S300 (e.g., wherein the bundle adjustment outputs the relative vehicle pose from the last timestep to the current timestep); alternatively, a different bundle adjustment or method can be used to determine the updated vehicle pose in S300.

Determining the refined sensor pose can include fitting one or more refined sensor poses to one or more corresponding splines (e.g., determined from prior sensor poses). This can be performed within the bundle adjustment, wherein one or more equations within the bundle adjustment refines the sensor poses based on a linear or nonlinear function (e.g., learned or manually determined based on historical data), performed outside of the bundle adjustment (e.g., by fitting the refined sensor pose to a linear or nonlinear function), and/or otherwise performed.

In a first variation of S200, the refined sensor poses are determined in a bundle (e.g., in a single nonlinear bundle adjustment).

In a second variation of S200, the refined sensor poses are solved individually for each refined sensor pose, vehicle parameter, bias, and/or any other output. Each output can be solved in series, parallel, periodically, and/or otherwise solved.

In a specific example of S200, the refined sensor poses and the vehicle parameters can be determined using a single non-linear bundle adjustment. The single non-linear bundle adjustment can include one or more sub functions (e.g., sub-models, sub-equations), each of which can solve for a different output. However, the non-linear bundle adjustment can be otherwise used. Additionally or alternatively, multiple non-linear bundle adjustments can be chained to solve for the output, and/or the output can be determined using any other suitable process.

However, determining refined sensor poses can additionally or alternatively include any other suitable elements performed in any other suitable manner.

5.3 Determining an Updated Vehicle Pose Based on the Measurements and Operation Matrices S300.

Determining an updated vehicle pose based on the measurements and operation matrix(es) S300 functions to update the vehicle pose based on the relative pose of vehicle from last timestep to the current timestep and/or the vehicle motion and/or provide any other suitable functionality.

Determining an updated vehicle pose can be performed every frame, after a predetermined number of frames (e.g., 5 frames, 10 frames 20 frames, 50 frames, 100 frames, etc.), periodically (e.g., 5 seconds, 10 seconds, 5 minutes, 10 minutes, 30 minutes, 1 hour, 3 hours, etc.), and/or at any other suitable time.

The updated vehicle pose can be used to control the vehicle (e.g., localization, navigation, etc.), to determine operation instructions for the vehicle, and/or for any other suitable purpose related to the vehicle.

The updated vehicle pose is preferably performed online, but can be additionally or alternatively performed offline. In a first variation, the updated vehicle pose is determined by the processing system. In a second variation, the updated vehicle pose is determined at a remote processing system. In a third variation, the updated vehicle pose is determined at a remote processing system and used to update a vehicle pose at the local processing system.

The updated vehicle pose can be a value, a vector, a matrix, and/or any other suitable data element.

The updated vehicle pose can be relative to a global reference (e.g., relative to a geographic location), relative to the vehicle pose at a different timestep (e.g., at the prior timestep), and/or relative to any other suitable reference.

The updated vehicle pose is preferably determined using the bundle adjustment from S300, but can additionally or alternatively be determined using a different bundle adjustment, and/or any other suitable process.

Determining the updated vehicle pose sensor pose can include fitting a vehicle pose to a spline (e.g., determined from past vehicle poses).

In a first variation, the updated vehicle pose is determined using odometry (e.g., visual odometry, visual inertial odometry). determining an updated vehicle pose can include: determining a vehicle pose relative to prior timestep (e.g., the fix) by determining a change in the vehicle pose over the timestep. Determining a vehicle pose relative to a prior timestep can include retrieving a prior vehicle pose, updating the prior vehicle pose with the change in vehicle pose to calculate the current vehicle pose, and/or any other suitable elements. The vehicle pose relative to prior timestep can be determined using the same or different bundle adjustment as that used to determine the relative sensor poses. The vehicle pose relative to prior timestep can be determined concurrently or asynchronously from the relative sensor poses (e.g., based on the same or different measurements).

In a second variation, the updated vehicle pose can be trilaterated on a predetermined map based on the extracted features (e.g., landmarks) determined from the measurements.

The updated vehicle pose can be additionally or alternatively determined using any other process.

The updated vehicle pose can be determined based on operation matrix(es). The operation matrix(es) preferably specify how a measurement from a sensor should be transformed to the vehicle's reference frame, but can additionally or alternatively specify: a sensor's pose relative to the vehicle (e.g., a vehicle reference point, such as the base frame), multiple sensors' measurement transformation, multiple sensors' poses relative to the vehicle, and/or any other suitable data. The operation matrix is preferably used to interpret the one or more feature positions relative to the vehicle (e.g., using optical flow, VIO, etc.), such that the vehicle pose and/or a change in the vehicle pose over time can be determined.

Determining the updated vehicle pose can optionally include determining one or more operation matrices, which functions to determine a calibration matrix used to determine the updated vehicle pose, but can additionally or alternatively perform any other suitable functionality. The operation matrix can be the same or a different matrix than the one used to determine the refined sensor poses. Determining the operation matrix can include retrieving the operation matrix from storage; selecting the operation matrix from a database, table, graph, etc.; calculating the operation matrix; and/or otherwise determining the operation matrix. The operation matrix can be an evaluation matrix (e.g., from prior timestep, that other evaluation matrix converged on in Sztoo, etc.), an initial matrix, and/or any other matrix. Determining the operation matrix can additionally or alternatively include any other suitable elements performed in any other suitable manner.

However, determining the updated vehicle pose can additionally or alternatively include any other suitable elements performed in any other suitable manner.

5.4 Determining Evaluation Sensor Poses Based on the Refined Sensor Poses S400.

Determining evaluation sensor poses based on the refined sensor poses S400 functions to smooth changes in the calibration matrices and/or sensor biases over time and/or filter out noise in the relative sensor pose estimates per timestep. The evaluation sensor poses can be used: to update the operation matrix(es); to determine evaluation sensor poses that can optionally be used to initialize the bundle adjustment in the next timestep in S200; to optionally reject outliers (e.g., activating different focal lengths across a stereocamera pair, rejecting blurry and/or blocked images, such as resulting from camera tampering, etc.), and/or to perform any other functionality.

The evaluation sensor poses are preferably determined after S200, but can additionally or alternatively be determined before (e.g., based on visual and spatial data from a single visual system). The evaluation sensor poses can be determined for each timestamp, sensor measurement (e.g., after each time S100 is performed), and/or at any other suitable time. The evaluation sensor poses can be determined contemporaneously with S300, before S300, after S300, and/or determined at any other time.

The evaluation sensor poses are preferably determined at a slower frequency than S200 (e.g., half the frequency of S200, quarter, eighth, sixteenth, twentieth, thirtieth, etc.), but can additionally or alternatively be determined at the same frequency, a faster frequency, and/or any other suitable frequency. This can function to conserve computational resources, reduce the influence of sensor pose estimate outliers on the evaluation sensor pose, and/or confer other benefits. In a first variation, an S400 instance is performed using all sensor pose estimates from S200 for the prior epoch (e.g., timeframe, since the last S400 instance). In a second variation, the sensor pose estimates from S200 are filtered for anomalies or outliers (e.g., by comparing against each other, comparing against an expected sensor pose estimate, comparing against the prior evaluation sensor pose, etc.), wherein the anomaly-removed sensor pose estimates are used in S400. In a third variation, sensor pose estimates from S200 can be randomly selected for use in S400. However, the sensor pose estimates can be otherwise managed.

The evaluation sensor poses are preferably determined online by the processing system onboard the vehicle, but can additionally or alternatively be determined offline by a remote processing system, and/or by any other suitable processing system.

The evaluation sensor poses can be determined based on a single matrix, multiple matrices, and/or any other suitable data. The matrices are preferably representative of relative poses of all sensors relative to each other and relative to the vehicle (e.g., cameras, IMUs, wheel odometry sensors, GPS sensor, etc.). The matrix(es) can be the initial matrices, the evaluation relative poses from prior timesteps, the operation matrices, and/or any other suitable matrices.

When the one or more matrices that the evaluation sensor poses are determined from are defined with respect to a different reference frame than an expected reference frame (e.g., expected by the time series algorithm of S400), the method can optionally include transforming the refined relative sensor poses from a first reference frame (e.g., common reference frame, such as the one used by the bundle adjustment) to a second reference frame (e.g., pairwise reference frame, reference frame that the time series algorithm is operating in) prior to S400.

The evaluation sensor poses can additionally or alternatively be determined based on the measurements from S100, the vehicle motion over the last timestep, uncertainties (e.g., from S200), and/or any other suitable poses, matrices, or other data.

In a first variation, the evaluation sensor poses can be determined based on the initial matrices determined in Shoo and the refined sensor poses determined in S200.

In a second variation, the evaluation sensor poses can be determined based on the operation matrices and the refined sensor poses determined in S200.

In a third variation, when the refined sensor poses include absolute positions and/or rotations, S400 can include using the positions and/or rotations to determine current transformation matrices, and determining the evaluation sensor poses based on the current transformation matrices.

The evaluation sensor poses are determined based on: either the initial and/or updated relative pose estimates of all components (or a subset thereof) relative to every other sensor component (or subset thereof) (e.g., determined based on the refined sensor poses from S200; treated as the "observations" of a Kalman filter), refined relative poses for all components relative to each other determined in S200; the vehicle egomotion over the last timestep; uncertainties and/or residuals of the bundle adjustment of the last timestep (e.g., from S200); temperature measurements; a predicted relative pose estimate (e.g., a priori state estimate, determined based on the evaluation sensor pose from the prior timestamp), the prior evaluation sensor pose; sensor poses determined based on the operation matrix; the prior covariance; and/or any other suitable data. When the calculation is performed in the matrix space, all references to "sensor pose" when used in the context of a matrix calculation above can be considered as referencing a transformation matrix.

In a specific example, the evaluation sensor poses are determined based on: the refined sensor poses from S200, transformed into a pairwise transformation matrix; the prior evaluation sensor pose (or prior evaluation matrix); and the prior estimate covariance. In a second specific example, the operation matrix is used instead of the prior evaluation matrix. However, the evaluation sensor pose can be otherwise determined.

The evaluation sensor poses can be determined using one or more time series analyses, which can be time series algorithms and/or filters (e.g., dynamic Bayesian network, such as a Kalman filter, extended Kalman filter, Hidden Markov Model, neural network, etc.; moving average filter, which can include weights, such as exponential, linear, etc.; dynamic data reconciliation filter; etc.), but can additionally or alternatively be determined using any other suitable algorithm.

The evaluation sensor poses can additionally or alternatively be determined by fitting the evaluation sensor poses to one or more corresponding splines (e.g., determined from prior evaluation sensor poses).

In a first variation, all of the evaluation sensor poses can be determined in a bundle, using a single time series filter.

In a second variation, each of the evaluation sensor poses can be determined using different includes time series filters.

Figure 3:
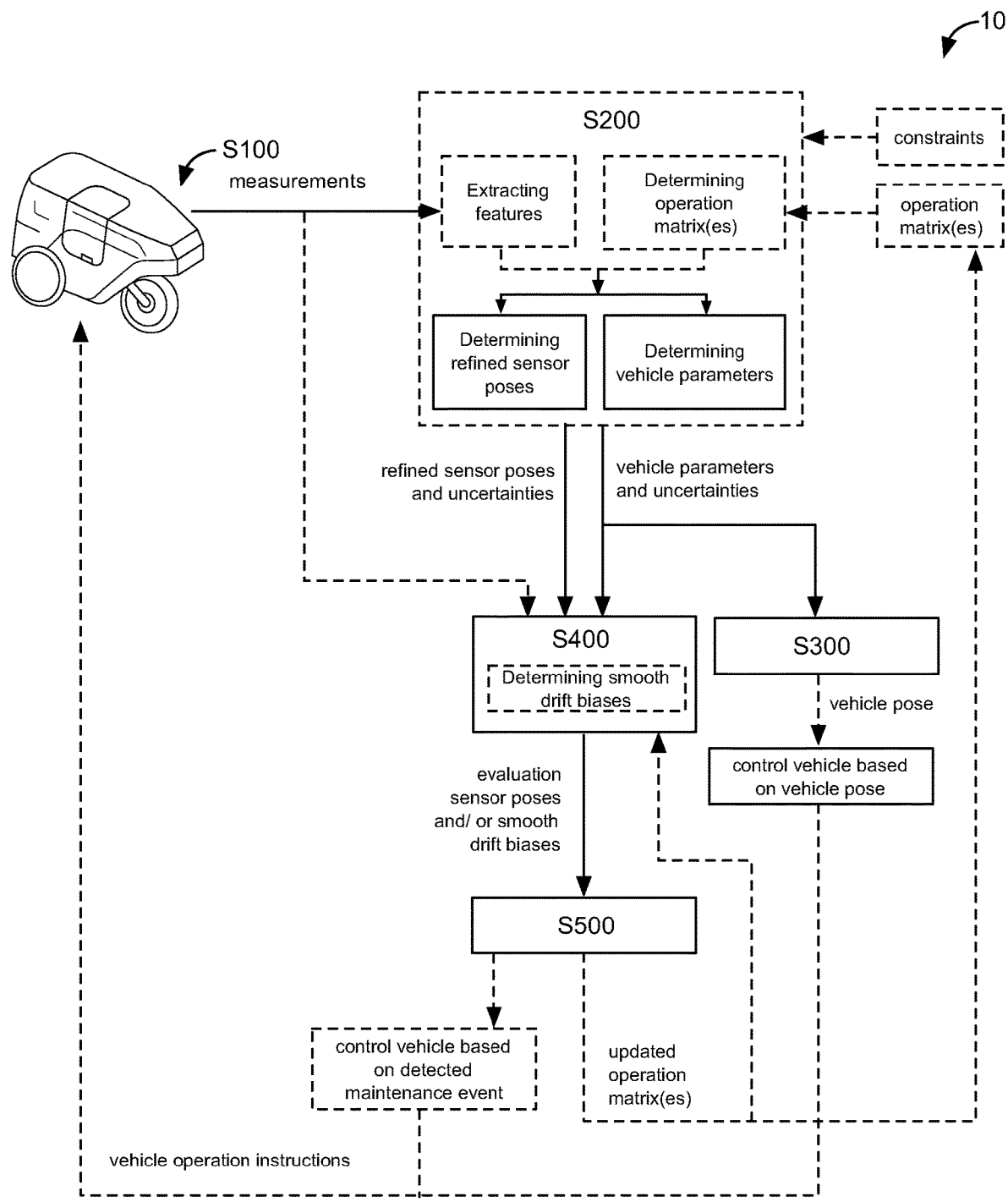
FIG. 3-5 depict schematic representations of variants of the method.
Figure 5:
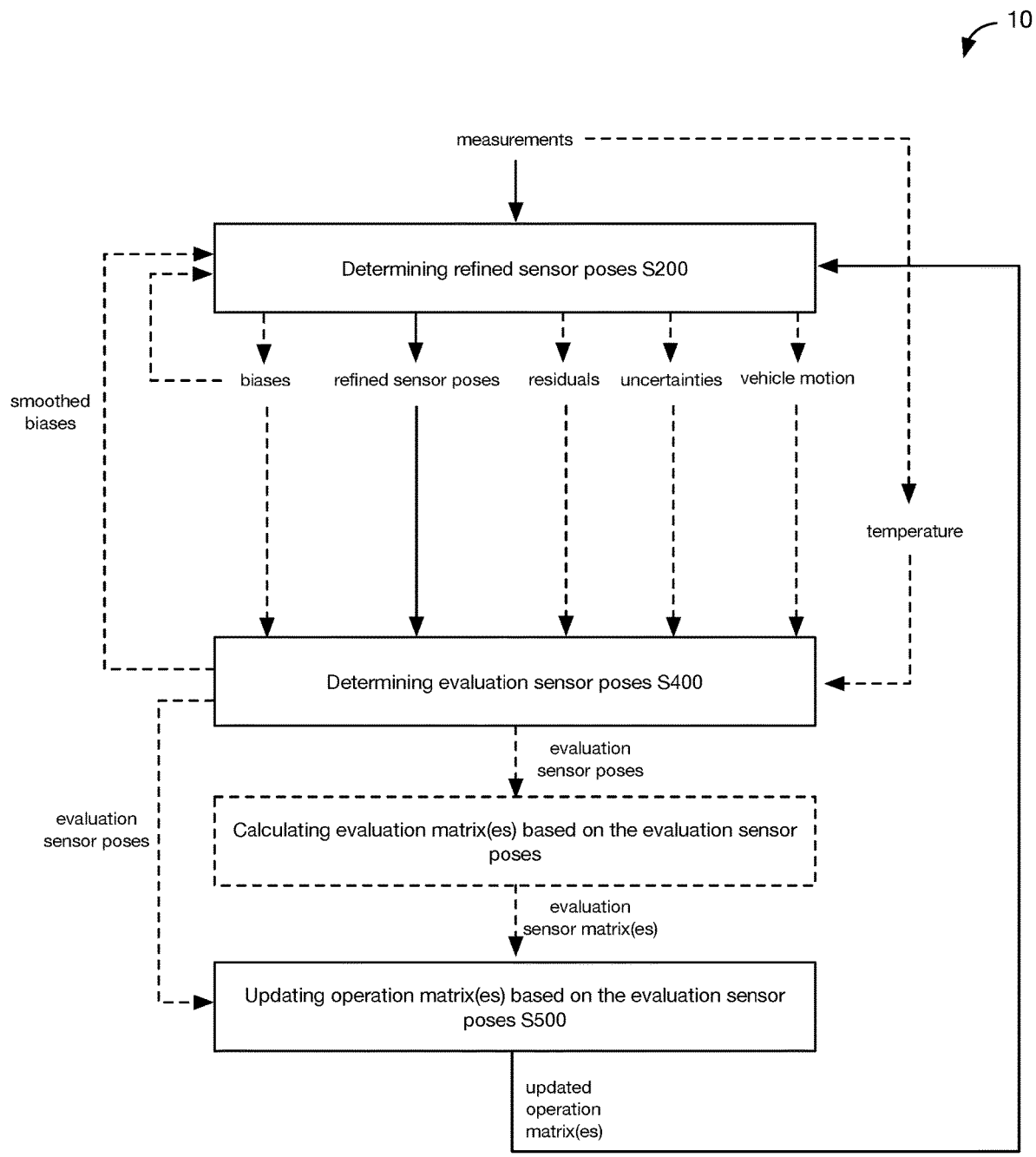

Determining the evaluation sensor poses can optionally include smoothing one or more sensor biases over time. The smoothed sensor biases can be determined using a drift filter (e.g., calibrated noise model for each spatial sensor), which can function to remove noise from the spatial measurements and/or perform any other suitable functionality. Determining the smoothed sensor biases can optionally include fitting the one or more sensor biases to corresponding splines (e.g., determined from prior sensor biases). The sensor biases can additionally or alternatively be determined using the same time series algorithm as the evaluation sensor poses, and/or any other suitable algorithm. In a specific example the drift biases can be smoothed using an IMU drift filter. The smoothed biases can be used as initialization variables in the next timestep of S200, to determine the evaluation sensor poses in S400, and/or used for any other process. Variants of the sensor biases are depicted in FIGS. 3 and 5.

The evaluation sensor poses and/or sensor biases can be: stored (e.g., cached, persistently stored, etc.), used in the next S200 iteration (e.g., used to initialize the bundle adjustment in the next timestep), used as the a priori estimate for the next S400 iteration, used to replace the operation matrix, used to determine whether the evaluation relative sensor poses have converged (and subsequently used to replace the operation matrix), and/or otherwise used.

However, determining the evaluation sensor poses can additionally or alternatively include any other suitable elements performed in any other suitable manner.

5.5 Updating the Operation Matrix(es) Based on the Evaluation Sensor Poses S500.

Updating the operation matrix(es) based on the evaluation sensor poses S500 functions to update the operation matrices (e.g., to adjust the operation matrices as the sensors shift during to operation) and/to perform any other functionality. In a specific example, S500 can function to update the vehicle-to-camera pose transformation matrix (e.g., to adjust the matrix as the sensors shift over time).

The updated operation matrices can be subsequently used in: S200, S300, and/or S400.

Updating the operation matrix(es) can be performed after the evaluation matrices converge, after a time period (e.g., 30 minutes, 1 hour, 2 hours, 3 hours, etc.).

In a first variation, the operation matrix(es) can be updated after convergence. This variation can include determining evaluation matrix convergence.

Determining evaluation matrix convergence over time (e.g., in relative sensor poses, in biases, etc.) functions to determine that the shifted sensor poses (represented by the evaluation matrix) are stable and not substantially changing over time (e.g., changing less than a predetermined threshold). Convergence in the relative sensor poses can be used in Shoo to update the operation matrix(es), used in S200 to initialize the bundle adjustment in the next timestep, and/or otherwise used. Similar or different methods can be used to determine bias convergence over time, wherein the converged biases can be used in S200 as bias initialization variables and/or otherwise used by the system.

Determining convergence can include determining that a relative sensor pose has converged, determining satisfaction of a convergence condition, determining biases have converged, and/or otherwise determined.

The convergence condition can include: the uncertainty (ies) from S200 falling below a predetermined threshold, an uncertainty score falling below a predetermined threshold (e.g., calculated from one or more of the uncertainties from S200), the evaluation sensor poses from a current timestep deviating less than a predetermined threshold from the evaluation sensor poses from one or more prior timesteps (e.g., a single prior timestep, timesteps within an evaluation epoch, timesteps since an event, such as the last operation matrix update, etc.), a residual error from S200 falling below a predetermined threshold, and/or any other suitable condition.

In a second variation, the operation matrix(es) can be updated by checking if S400 has converged after a period of time, and if S400 has converged, updating the operation matrix(es).

The operation matrix(es) can be updated by replacing the prior operation matrix(es) with the converged evaluation sensor poses, or otherwise updated. The converged evaluation sensor poses can be: the most commonly-occurring evaluation sensor poses, an average of the evaluation sensor poses (e.g., including or excluding outlier evaluation sensor poses), the last evaluation sensor pose, and/or otherwise determined.

In a first variation, each extrinsic matrix can be replaced by the corresponding converged evaluation sensor pose.

In a second variation, each extrinsic matrix can be re-calculated based on the corresponding converged evaluation sensor pose.

In a third variation, each extrinsic matrix can be weighted based on a transformation of the corresponding converged evaluation sensor pose.

In a fourth variation, each extrinsic matrix can be updated based on a score associated with a corresponding converged evaluation sensor pose and/or refined sensor pose, and the extrinsic matrix can be updated when the score exceeds a threshold and/or when a set of rules and/or heuristics are satisfies based on the score. The operation matrix(es) can be additionally or alternatively updated using any other suitable process.

The method can optionally include detecting a maintenance event (e.g., flagging the vehicle as unsafe to operate). After a maintenance event is detected, the vehicle is preferably controlled (e.g., automatically by the processing system, manually by a remote controller, etc.) to a stopping location (e.g., parked on the side of the road, parked in a parking lot, navigated to a maintenance facility, etc.). The maintenance event can be detected when convergence in either S500 and/or S200 is not determined after a predetermined number of iterations and/or after a predetermined period, when the deviation in sequential evaluation sensor poses exceeds a threshold, when the evaluation sensor pose deviates from the initial sensor pose beyond a threshold, when bias convergence is not determined in S500, when one or more of the spatial sensor measurements are greater than a threshold, when one or more of the biases is greater than a threshold, when the reprojection error and/or residuals from S400 is greater than a threshold, when the uncertainties are greater than a threshold, and/or any other condition. However, the maintenance event can be detected based on any other suitable data and/or measurement.

However, updating the operation matrix(es) can additionally or alternatively include any other suitable elements performed in any other suitable manner.

5.6 Determining Initial Matrices S600.

The method can optionally include determining initial matrices Shoo, which functions to determine the initial operation matrix(es). The initial matrices can be used as an initial matrix from which to determine the operation matrix(es), which can be used to determine the vehicle pose, or be otherwise used. The initial matrices can be determined before a vehicle driving session, before a vehicle deployment, and/or at any other suitable time.

In a first variation, all of the initial matrices (or a subset thereof) can be determined in parallel.

In a second variation, the initial matrices can be determined individually, wherein the extrinsic matrices and/or sensor-to-vehicle transformations can be calculated after the intrinsic matrix(es) are determined.

The initial calibration can be determined based on the measurements collected by the one or more sensors from S100 and/or any other suitable data. Determining the initial calibration can include reducing a calibration search space for determining a correlation between sensor-to-sensor pairs by correlating features along the horizontal axis, the vertical axis, and/or the depth axis, but the method can additionally or alternatively not reduce the search space. Determining the initial calibration can include determining a pixel-to-pixel mapping, and/or any other suitable calibration mapping, which can be used to determine the initial matrices.

Determining the initial matrices can include determining acceleration measurements contemporaneously with the camera and/or spatial sensor measurements.

In a first variation, determining the initial calibration can include calibrating each spatial sensor, more specifically, each IMU of a visual system. In a first example, the system can excite each dimension of the IMU for a particular visual system (e.g., accelerometers, gyroscopes, magnetometers, etc.). The motion from the excitement can be correlated with motions detected in the images sampled by the cameras at the same timestep of the particular visual.

Determining the initial matrices can include determining initial relative sensor poses and storing the initial relative sensor poses (e.g., cached, persistently stored, etc.), such as for use in S500.

In a first variation, the initial matrices can be determined using a nonlinear bundle adjustment (e.g., the same nonlinear bundle adjustment used in S200, a different bundle adjustment, and/or any other process).

In a first example, the initial calibration can be determined using two non-linear bundle adjustments. A first nonlinear bundle adjustment can use the measurements (e.g., inertial sensor measurements and/or visual measurements) to determine an initial set of calibration matrices (e.g., intrinsic matrices, extrinsic matrices such as the sensor-to-sensor transformation matrices, etc.). A second non-linear bundle adjustment can determine a second set of the extrinsic matrices (e.g., sensor-to-vehicle transformation matrices, etc.) based on the outputs of the first nonlinear bundle adjustment and optionally additional sampled measurements (e.g., from the measurements).

In a second variation, the initial matrices can be determined using a standard calibration for each matrix (e.g., with fiducial targets, with ICP, etc.). For example, the vehicle can be placed on top of a turntable, with fiducial targets placed in shared fields of view of the visual systems to extract 2D and/or 3D points. After point extraction, the points can be re-projected into each camera view. The re-projected points can be used as input to the non-linear bundle adjustment, wherein the non-linear bundle adjustment can minimize the re-projection errors and/or point-to-point residuals of the correlated points. Determining the initial matrix can additionally or alternatively include any other suitable elements performed in any other suitable manner.

6. ILLUSTRATIVE EXAMPLES

In a first illustrative example, the method can include iteratively, during vehicle operation: sampling measurements from onboard sensors; extracting features from the measurements; determining a refined calibration matrix (e.g., refined sensor poses) based on the features using a bundle adjustment; determining an evaluation calibration matrix (e.g., updated sensor poses) based on the refined calibration matrix using a Kalman filter (e.g., filtering out noise in the calibration matrices over time); and, upon evaluation calibration matrix convergence, updating the operation matrix with the converged calibration matrix. The method can optionally include determining vehicle motion between timesteps (e.g., a current relative vehicle pose) based on the features and an operation matrix; determining a vehicle pose (relative to a global reference) based on the current relative vehicle pose; and controlling the vehicle based on the vehicle pose.

In this example, the system includes a vehicle and a visual system mounted to the vehicle and including cameras statically mounted with an IMU. The bundle adjustment (at each timestep) is initialized with the calibration matrix relating the cameras to the vehicle frame (e.g., from the operation matrix; the prior timestep's updated calibration matrix) and IMU drift biases, and accepts, as inputs: the wheel odometry, GPS measurements, feature observations from the cameras, feature observations from the LiDAR, and IMU observations over the last epoch. The bundle adjustment solves for the following outputs: relative pose of cameras to vehicle, relative pose of IMU to cameras, IMU drift biases along all IMU drift axes for all IMUs, bias of wheel odometry relative to vehicle frame, GPS bias relative to vehicle frame, and relative pose of vehicle over the last timestep, all while maintaining data sparsity at every timestep. The Kalman filter (e.g., extended Kalman filter) accepts, as the predicted state estimate or for the predicted state estimate calculation: the relative pose of all components relative to each other from the prior timestep (e.g., the updated calibration matrix from the prior time step), and accepts, as the current measurements or observations: the relative pose of all components relative to each other from the bundle adjustment, the vehicle egomotion over the last timestep, the uncertainties and residual from the bundle adjustment, and temperature. The Kalman filter can output the updated relative poses of all components relative to each other (e.g., updated calibration matrix). In a specific example, the bundle adjustment treats the calibration matrices as adjustable variables that are solved for, and can output multiple calibration matrices (e.g., for different subject-reference frame combinations). In a specific example, the Kalman filter can accept a single matrix (e.g., describing all relationships, determined from the bundle adjustment output) as the calibration matrix portion of the observation. However, the method can be otherwise performed.

In a second illustrative example, the relative sensor poses are the calibration matrices. S200 receives the relative sensor poses as input and calculates refined sensor poses. The refined sensor poses are fed as input into S400 to determine evaluation sensor poses (e.g., a smoothed version of the refined sensor poses). The evaluation sensor poses are used in S500 to update the operation matrix(es).

In a third illustrative example, the relative sensor poses are absolute positions and/or orientations of each sensor (e.g., x, y, z, rotation, etc.). S200 receives the relative sensor poses and a current operation matrix(es) as input and calculates refined sensor poses (e.g., current absolute positions). The refined sensor poses are fed as input into S400 to determine evaluation sensor poses (e.g., a smoothed version of the refined sensor poses). The evaluation sensor poses are used to calculate an evaluation matrix(es), which can be used in S500 to update the operation matrix(es). A variant of the method is depicted in FIG. 5.

As shown in FIG. 3, in a fourth illustrative example, the method includes determining an initial matrix(es) for vehicle operation (e.g., using fiducials, ICP, etc.). After the initial matrices are determined, the vehicle can be deployed (e.g., driven in an environment). While the vehicle is deployed (e.g., translating), measurements can be collected at each timestamp (e.g., the timestamp is controlled by a global shutter for all of the cameras and sensors). A solver can process the measurements and the extracted features (e.g., corners, lines, and/or other feature correspondences tracked over time) to determine a vehicle motion estimate and refined sensor poses (e.g., sensor to sensor, and/or sensor to vehicle, etc.). The vehicle motion can be used to update the vehicle pose, wherein the vehicle can be controlled based on the updated vehicle pose. In one example, vehicle operation instructions can be determined from the updated vehicle pose. The refined sensor poses and/or uncertainties can be processed, using a Kalman filter (e.g., to remove noise from the refined sensor poses and or biases), to determine evaluation sensor poses, which can be used to identify sensor pose and/or bias convergence over time. Once convergence is determined between successive evaluation sensor poses for a given sensor pose, the particular sensor pose can be updated (e.g., the operation matrix(es) can be updated). The updated sensor poses can be used to perform subsequent iterations of the method. The method can terminate when the vehicle reaches an endpoint (e.g., a destination), is powered off, and/or upon satisfaction of any other suitable condition.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instruction. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for a vehicle comprising:
a vehicle sensor suite comprising an IMU; and
a processor configured to, during operation of the vehicle, iteratively:
    calculate sensor poses for each of a plurality of sensors of the vehicle sensor suite based on an operation calibration for the vehicle sensor suite and sensor measurements from the plurality of sensors;
    calculate a vehicle pose using a bundle adjustment, comprising:
        calculating an IMU drift bias using the bundle adjustment; and
        using a drift filter, determining a smooth IMU drift bias based on the IMU drift bias and a prior IMU drift bias determined during a prior timestep;
    calculate an evaluation calibration based on the sensor poses and the smooth IMU drift bias, wherein the evaluation calibration represents an updated version of the operation calibration; and
    update the operation calibration based on the evaluation calibration being within a threshold difference of a previous evaluation calibration,
wherein the processor is further configured to flag the vehicle when the evaluation calibration and the previous evaluation calibration satisfy a convergence-failure condition.

2. The system of claim 1, wherein the vehicle sensor suite is mounted to a flexible frame of the vehicle.

3. The system of claim 2, wherein the vehicle has a stiffness less than 150 Newton-meters per degree per kilogram.

4. The system of claim 1, wherein the updated operation calibration is determined online.

5. The system of claim 1, wherein the processor is further configured to
control the vehicle based on the vehicle pose.

6. The system of claim 1, wherein the processor is configured to calculate the evaluation calibration with a Kalman filter.

7. The system of claim 1, wherein the plurality of sensors comprises a visual system, wherein the visual system comprises a camera and the inertial measurement unit (IMU), and wherein the measurements comprise acceleration measurements from the IMU that were contemporaneously sampled with visual measurements from the camera.

8. A method for a vehicle, comprising:
during operation of the vehicle, repeatedly:
generating sensor measurements with a plurality of vehicle sensors, wherein the plurality of vehicle sensors comprises an IMU;
based on an operation calibration for the plurality of vehicle sensors and the sensor measurements, determining sensor poses for each of the plurality of sensors;
calculating an IMU drift bias using a bundle adjustment;
using a drift filter, determining a smooth IMU drift bias based on the IMU drift bias and a prior IMU drift bias determined during a prior timestep;
calculating an evaluation calibration based on the sensor poses and the smooth IMU drift bias; and
selectively updating the operation calibration when the evaluation calibration is within a threshold difference of a previous evaluation calibration; and
flagging the vehicle when the evaluation calibration and the previous evaluation calibration satisfy a convergence-failure condition.

9. The method of claim 8, further comprising: calculating a vehicle pose based on the sensor measurements and the operation calibration; and controlling the vehicle based on the vehicle pose.

10. The method of claim 9, wherein calculating the vehicle pose comprises fitting the vehicle pose to a spline.

11. The method of claim 8, wherein the sensor poses are calculated using a bundle adjustment.

12. The method of claim 11, wherein the plurality of sensors comprises an IMU, the method further comprising:
calculating an IMU drift bias using the bundle adjustment; and
determining a smooth IMU drift bias based on the IMU drift bias and a prior IMU drift bias determined during a prior timestep, using a drift filter;
wherein the evaluation calibration is calculated based on the smooth IMU drift bias.

13. The method of claim 8, wherein updating the operation calibration comprises:
determining that an evaluation calibration version has converged to a converged calibration; and
updating the operation calibration with the converged calibration.

14. The method of claim 13, wherein the evaluation calibration version is iteratively determined for each of a series of timesteps using a Kalman filter.

15. The method of claim 8, further comprising extracting a set of features from the measurements, wherein extracting the set of features comprises:
determining static features and dynamic features relative to an environment; and
extracting the static features; and
wherein a vehicle pose is determined based on the extracted static features.

16. The method of claim 8, wherein the operation calibration is initialized using an initial calibration, wherein the initial calibration is determined based on calibration acceleration measurements contemporaneously captured with calibration visual measurements.

17. The method of claim 8, wherein the plurality of sensors comprises a visual system, wherein the visual system comprises a camera and the IMU, and wherein determining the measurements comprises determining acceleration measurements from the IMU contemporaneously with determining visual measurements from the camera.

18. The method of claim 17, further comprising, for each visual system, filtering the visual measurements contemporaneously determined with acceleration measurements exceeding an acceleration threshold.

19. The method of claim 8, wherein the updated operation calibration is determined online.

* * * * *